US011326668B1

(12) United States Patent
Matsuda (10) Patent No.: US 11,326,668 B1
(45) Date of Patent: May 10, 2022

(54) DUAL CLUTCH TRANSMISSION-EQUIPPED POWER UNIT

(71) Applicant: KAWASAKI JUKOGYO KABUSHIKI KAISHA, Kobe (JP)

(72) Inventor: Yoshimoto Matsuda, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 17/074,435

(22) Filed: Oct. 19, 2020

(51) Int. Cl.
*F16H 3/00* (2006.01)
*F16H 3/093* (2006.01)

(52) U.S. Cl.
CPC .............. *F16H 3/006* (2013.01); *F16H 3/093* (2013.01); *F16H 2003/0931* (2013.01)

(58) Field of Classification Search
CPC ........ F16H 3/006; F16H 61/688; F16H 3/093; F16H 2200/006; F16H 2003/0931
See application file for complete search history.

(56) References Cited

U.S. PATENT DOCUMENTS

| | | | |
|---|---|---|---|
| 7,150,698 B2 * | 12/2006 | Sakamoto ............... | F16H 3/006 477/5 |
| 7,367,919 B2 * | 5/2008 | Fahland ................... | F16H 59/38 477/79 |
| 8,342,051 B2 | 1/2013 | Pritchard et al. | |
| 8,567,276 B2 * | 10/2013 | Saitoh ..................... | F16H 3/006 74/340 |
| 8,850,915 B2 * | 10/2014 | Fujimoto ................ | F16H 3/006 74/331 |
| 8,950,560 B2 * | 2/2015 | Mizuno .................... | F16D 23/12 192/20 |
| 9,695,883 B2 * | 7/2017 | Mizuno .................... | F16D 13/56 |
| 2002/0032060 A1 * | 3/2002 | Hojyo ....................... | F16F 7/00 464/39 |
| 2002/0033063 A1 * | 3/2002 | Hojyo ...................... | F02B 61/02 74/413 |
| 2003/0069103 A1 * | 4/2003 | Ibamoto .................. | B60L 15/20 475/5 |
| 2009/0205919 A1 * | 8/2009 | Cho ......................... | F16D 7/044 192/55.5 |

FOREIGN PATENT DOCUMENTS

| | | | | |
|---|---|---|---|---|
| DE | 102012204939 B4 * | 5/2018 | ......... | F16D 48/0206 |
| JP | 03175152 A * | 7/1991 | | |
| JP | 04191462 A * | 7/1992 | | |
| JP | 2616777 B2 * | 6/1997 | | |
| JP | 2007177866 A * | 7/2007 | | |
| JP | 2010057279 A * | 3/2010 | | |
| JP | 5172421 B2 * | 3/2013 | ............ | F16F 15/264 |

* cited by examiner

*Primary Examiner* — Victor L Macarthur (74) *Attorney, Agent, or Firm* — Alleman Hall Creasman & Tuttle LLP (57) ABSTRACT

A dual clutch transmission-equipped power unit includes a prime mover including a drive shaft and a dual clutch transmission that changes the speed of rotation produced by rotational power output by the drive shaft. The dual clutch transmission includes a first input shaft which overlaps the drive shaft when viewed in a first direction perpendicular to the drive shaft. The dual clutch transmission includes a second input shaft which overlaps the drive shaft when viewed in a second direction perpendicular to the drive shaft. The dual clutch transmission includes a countershaft which overlaps the drive shaft when viewed in a third direction perpendicular to the drive shaft.

14 Claims, 9 Drawing Sheets

DUAL CLUTCH TRANSMISSION-EQUIPPED POWER UNIT

BACKGROUND

Technical Field

An aspect of the present disclosure relates to a power unit including a prime mover and a dual clutch transmission.

Description of the Related Art

U.S. Pat. No. 8,342,051 B2 discloses a dual clutch transmission (DCT). The DCT includes a first gear train system having first, third, and fifth gear positions and a second gear train system having second, fourth, and sixth gear positions. Two clutches are provided respectively for the two gear train systems. The DCT is disposed on an extension of a crankshaft of an engine. The DCT changes the speed of rotation produced by rotational power transmitted from the crankshaft and outputs the resulting rotation.

The DCT is located lateral to the engine. Thus, the width of the power unit including the engine and the DCT is increased in the axial direction of the crankshaft. As such, when the power unit is mounted on a vehicle, the presence of the power unit could reduce the flexibility in arranging other vehicle components or narrow the occupant space.

SUMMARY

A dual clutch transmission-equipped power unit according to an aspect of the present disclosure includes: a prime mover including a drive shaft; and a dual clutch transmission that changes the speed of rotation produced by rotational power output by the drive shaft, the dual clutch transmission including: a first input shaft configured to be connected to the drive shaft; a second input shaft configured to be connected to the drive shaft; a first clutch configured to disable power transmission from the drive shaft to the first input shaft; a second clutch configured to disable power transmission from the drive shaft to the second input shaft; a countershaft; a plurality of first speed change gear pairs configured to transmit power from the first input shaft to the countershaft; and a plurality of second speed change gear pairs configured to transmit power from the second input shaft to the countershaft, wherein the first input shaft overlaps the drive shaft when viewed in a first direction perpendicular to the drive shaft, the second input shaft overlaps the drive shaft when viewed in a second direction perpendicular to the drive shaft, and the countershaft overlaps the drive shaft when viewed in a third direction perpendicular to the drive shaft.

In the above configuration, the locations of the first input shaft, second input shaft, and countershaft overlap the location of the drive shaft on the coordinate in the axial direction of the drive shaft. As such, the width (the size in the axial direction) of the dual clutch transmission-equipped power unit can be reduced.

DETAILED DESCRIPTION OF THE EMBODIMENTS

Hereinafter, exemplary embodiments will be described with reference to the drawings. The directions mentioned in the following description are those based on the direction in which a driver of a utility vehicle 1 faces. Specifically, a travel direction in which the utility vehicle 1 travels straight is referred to as a front-rear direction, and a lateral direction transverse to the travel direction is referred to as a left-right direction.

Figure 1:
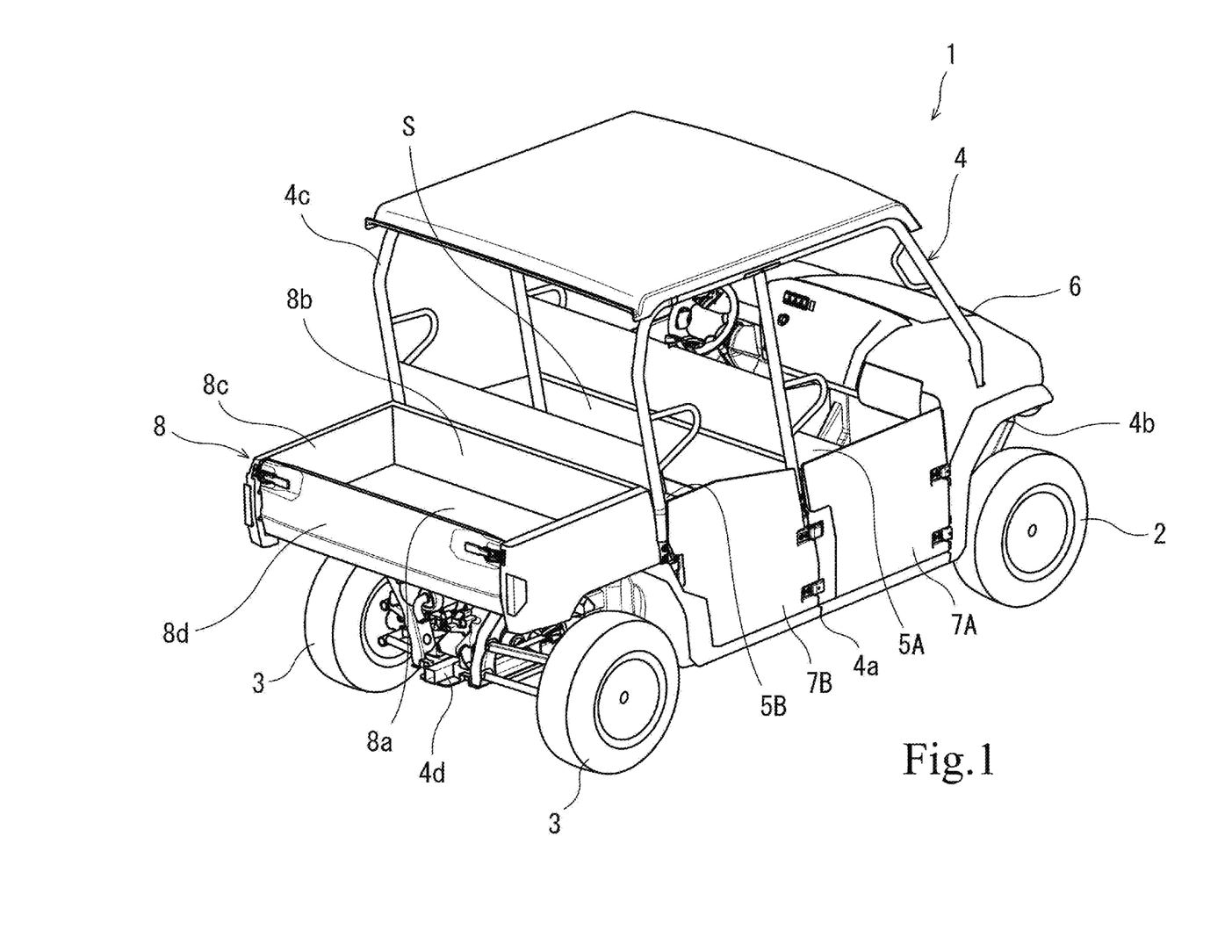
FIG. 1 is a right rear perspective view of a utility vehicle according to an exemplary embodiment.

FIG. 1 is a right rear perspective view of the utility vehicle 1 according to an exemplary embodiment. As seen from FIG. 1, the utility vehicle 1 includes a pair of left and right front wheels 2 and a pair of left and right rear wheels 3. The front and rear wheels 2 and 3 support a vehicle body frame 4. Balloon tires are used in the front and rear wheels 2 and 3. The vehicle body frame 4 is a pipe frame made up of a plurality of pipes connected together.

The vehicle body frame 4 includes a base frame portion 4a, a front frame portion 4b, a cabin frame portion 4c, and a rear frame portion 4d. The base frame portion 4a supports a front seat row 5A (including a driver seat and a passenger seat) and a rear seat row 5B. The occupant seats need not be arranged in two rows and may be arranged in a single row. The front frame portion 4b extends forward from the base frame portion 4a and supports the front wheels 2 and other components. The cabin frame portion 4c projects upward from the base frame portion 4a and surrounds an occupant space S in which the front and rear seat rows 5A and 5B are disposed. The occupant space S surrounded by the cabin frame portion 4c is exposed to the outside environment. The rear frame portion 4d extends rearward from the base frame portion 4a and is located rearward of the cabin frame portion 4c.

A hood 6 made of resin is located forward of the cabin frame portion 4c. The hood 6 is supported by the front frame portion 4b and covers from above the space between the left and right front wheels 2. The hood 6 is openable to uncover the space. Front side doors 7A and rear side doors 7B are disposed below the cabin frame portion 4c. The front side doors 7A are located on both sides of the front seat row 5A, and the rear side doors 7B are located on both sides of the rear seat row 5B.

A cargo bed 8 is located rearward of the cabin frame portion 4c. The cargo bed 8 is supported by the rear frame portion 4d. The cargo bed 8 includes a bottom wall 8a, a front wall 8b, a pair of side walls 8c, and a rear wall 8d and opens upward. The rear wall 8d is configured to pivot between a normal position where the rear wall 8d is placed vertically and an open position where the rear wall 8d lies horizontally. Below the cargo bed 8 is located a dual clutch transmission (DCT)-equipped power unit 10 (see FIG. 2) which is supported by the rear frame portion 4d.

Figure 2:
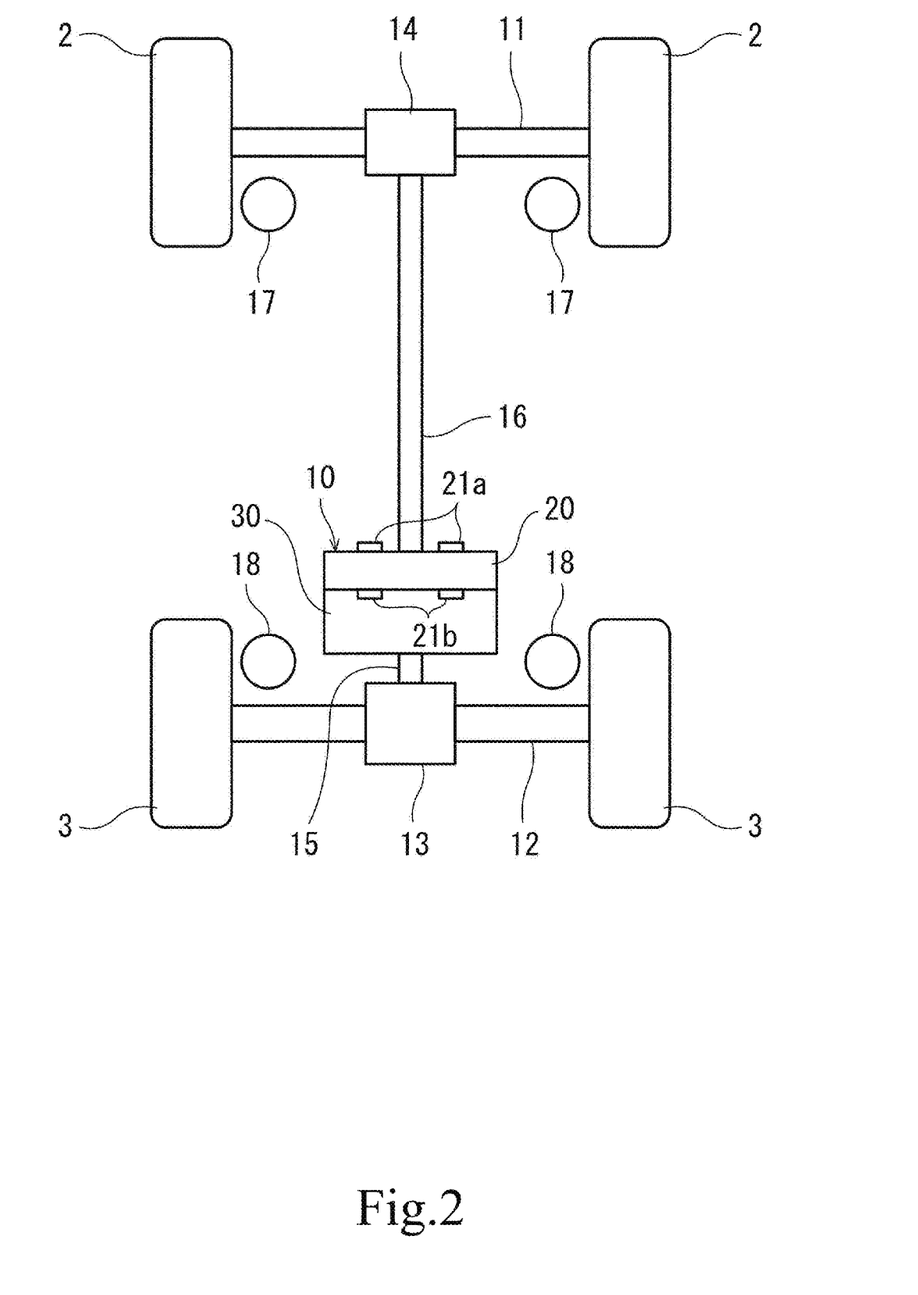
FIG. 2 is a plan view of a drive system of the utility vehicle of FIG. 1.

FIG. 2 is a plan view of a drive system of the utility vehicle 1 of FIG. 1. As seen from FIG. 2, the left and right front wheels 2 are connected respectively to both ends of a front axle 11 extending in the left-right direction. The left and right rear wheels 3 are connected respectively to both ends of a rear axle 12 extending in the left-right direction. The utility vehicle 1 includes the DCT-equipped power unit 10 which outputs drive power for driving the front wheels 2 and/or rear wheels 3. The DCT-equipped power unit 10 is located between the left and right rear wheels 3. The drive power output by the DCT-equipped power unit 10 is transmitted to the rear axle 12 through an output shaft 15 and a rear differential 13. The drive power output by the power unit 10 can be selectively or permanently transmitted to a propeller shaft 16 through the output shaft 15. The rotational power of the propeller shaft 16 is transmitted to the front axle 11 through a front differential 14. The output shaft 15 is disposed such that the location of the output shaft 15 in the left-right direction coincides with the location of at least a part of the DCT-equipped power unit 10 in the left-right direction.

A pair of left and right front suspensions 17 are located in the vicinity of the front wheels 2. The front suspensions 17 connect the front wheels 2 to the vehicle body frame 4 (see FIG. 1). A pair of left and right rear suspensions 18 are located in the vicinity of the rear wheels 3. The rear suspensions 18 connect the rear wheels 3 to the vehicle body frame 4 (see FIG. 1). The DCT-equipped power unit 10 is located between the left and right rear suspensions 18 in the left-right direction. The DCT-equipped power unit 10 and the rear suspensions 18 are located vertically below the cargo bed 8 (see FIG. 1). The DCT-equipped power unit 10 is placed in a position where its longitudinal direction extends in the left-right direction.

When the DCT-equipped power unit 10 is placed to extend longitudinally in the left-right direction, the DCT-equipped power unit 10 can easily be spaced rearward from the occupant space S. This increases the flexibility in the layout of the occupant space S. Additionally, the DCT-equipped power unit 10 is compact and has a reduced longitudinal length as described later. Thus, vehicle components (such as the rear suspensions 18) located below the cargo bed 8 are less likely to interfere with the DCT-equipped power unit 10, so that the flexibility in the layout of the vehicle components below the cargo bed 8 is also increased.

Figure 3:
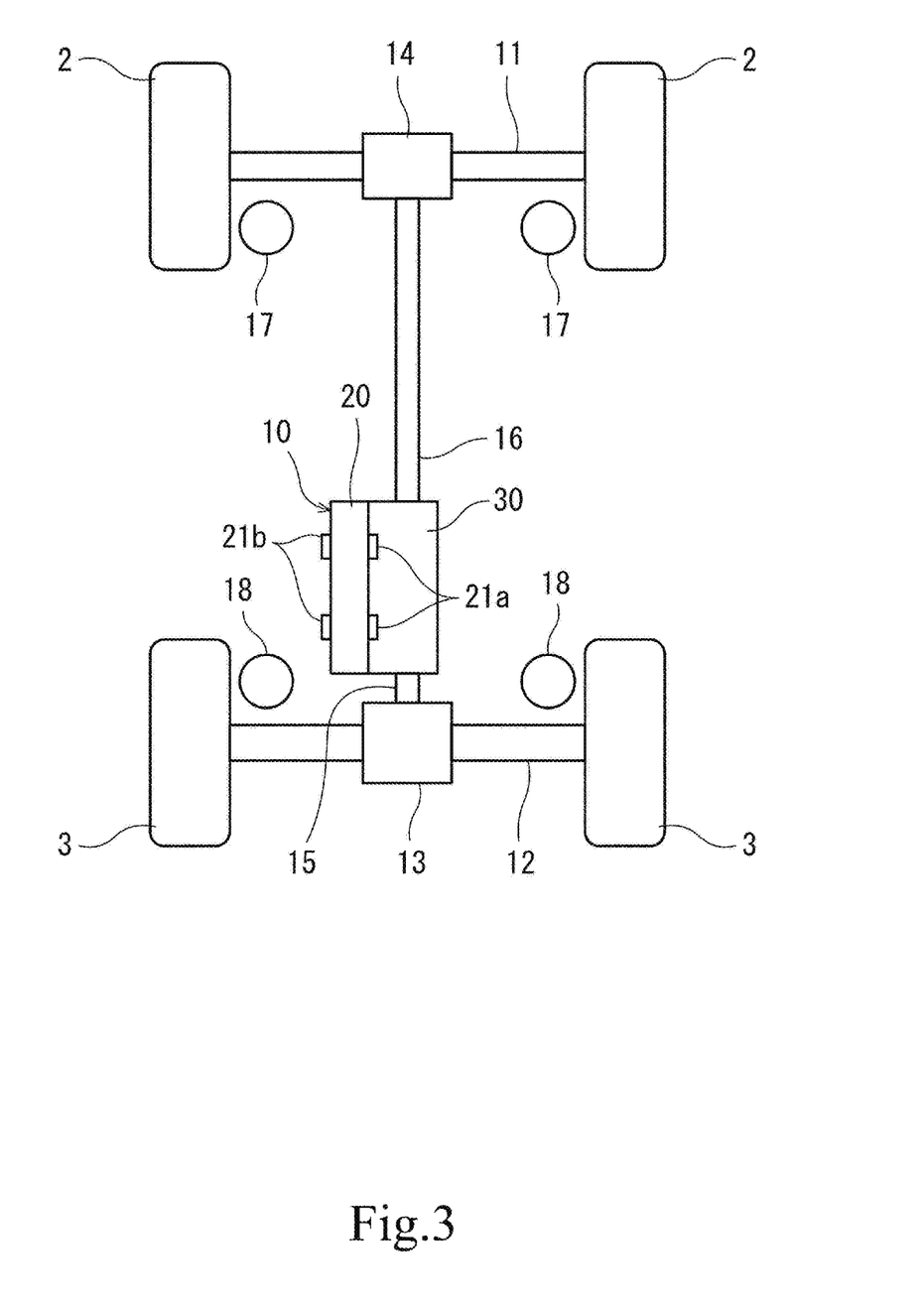
FIG. 3 is a plan view of a variant of the drive system of FIG. 2.

FIG. 3 is a plan view of a variant of the drive system shown in FIG. 2. The DCT-equipped power unit 10 located vertically below the cargo bed 8 (see FIG. 1) may, as shown in FIG. 3, be placed in a position where the longitudinal direction of the DCT-equipped power unit 10 extends in the front-rear direction. When the DCT-equipped power unit 10 is placed to extend longitudinally in the front-rear direction, the DCT-equipped power unit 10 can easily be spaced apart from vehicle components (such as the rear suspensions 18) located lateral to the DCT-equipped power unit 10. This increases the flexibility in the layout of the vehicle components below the cargo bed 8. Additionally, since the DCT-equipped power unit 10 is compact and has a reduced longitudinal length as described later, the DCT-equipped power unit 10 can easily be spaced rearward from the occupant space S. Thus, the flexibility in the layout of the occupant space S is also increased.

Figure 4:
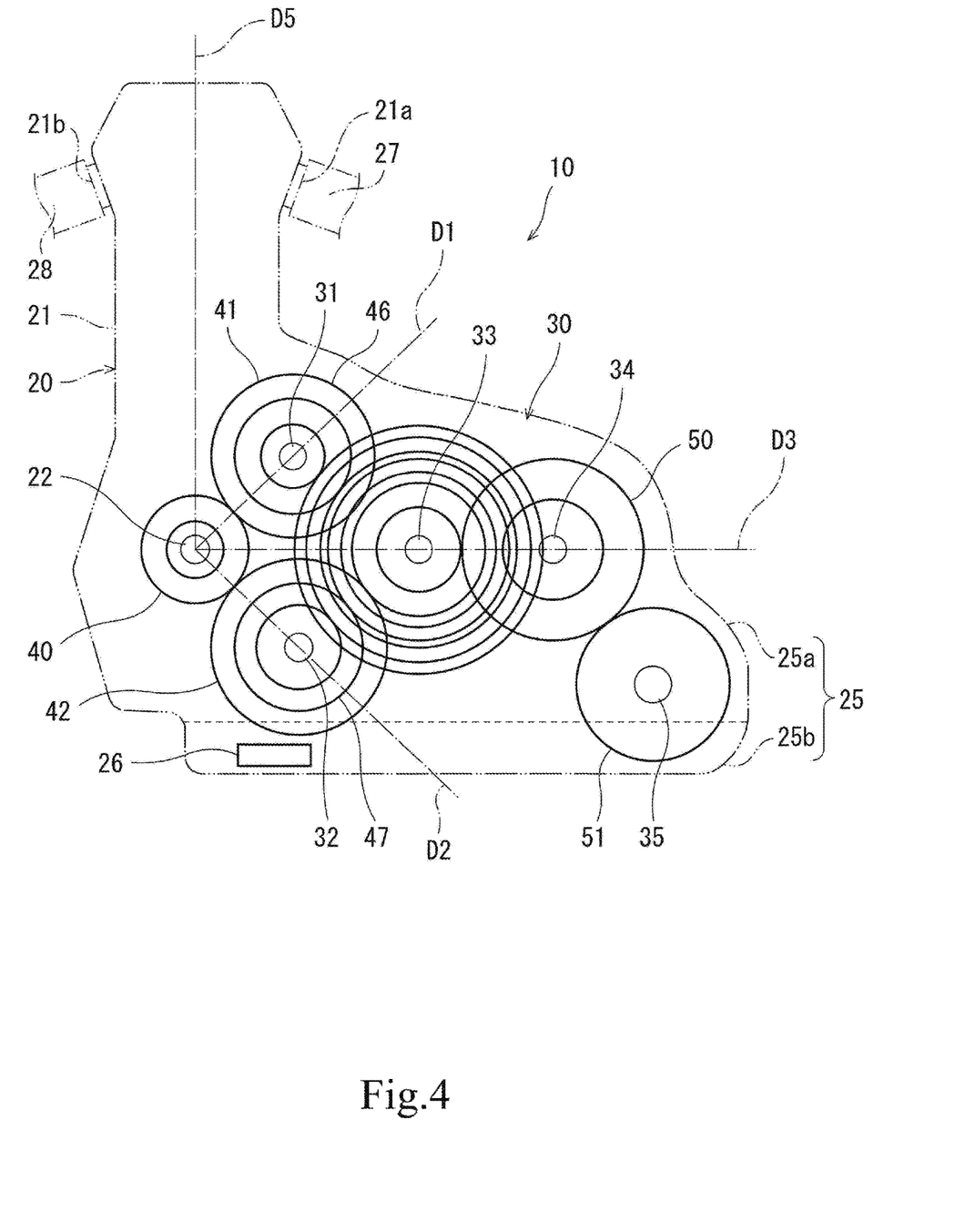
FIG. 4 is a side view of a power unit shown in FIG. 2.

FIG. 4 is a side view of the DCT-equipped power unit 10 shown in FIG. 2. Referring to FIG. 4, the DCT-equipped power unit 10 includes: an engine 20 (prime mover) configured as an internal combustion engine; and a dual clutch transmission (DCT) 30 configured to change the speed of rotation produced by rotational power output by the engine 20. In the present embodiment, the engine 20 includes a cylinder 21 and a crankshaft 22 (drive shaft) to which reciprocation of a piston in the cylinder 21 is transmitted as rotational motion. The engine 20 is, for example, a multi-cylinder engine (e.g., a two- to four-cylinder engine). For example, the cylinder 21 projects upward with respect to the crankshaft 22. An electric motor may be used as the prime mover instead of the engine 20. Another power transmission device (e.g., a CVT) may be disposed between the crankshaft 22 of the engine 20 and the DCT 30.

The DCT-equipped power unit 10 includes a power unit case 25 adjacent to the crankshaft 22 of the engine 20 in the radial direction of the crankshaft 22. The power unit case 25 serves both as a crankcase enclosing the crankshaft 22 and a transmission case enclosing the DCT 30. The power unit case 25 includes a case main body 25a and an oil pan 25b located beneath the case main body 25a. A hydraulic pump unit 26 is placed inside the oil pan 25b. The oil pan 25b stores an lubricant oil, and the lubricant oil is sucked under the action of the suction force of the hydraulic pump unit 26 and delivered to various portions of the DCT-equipped power unit 10. The hydraulic pump unit 26 is located vertically below input shafts 31 and 32. As such, the length of a hydraulic path between the hydraulic pump unit 26 (hydraulic pressure source) and hydraulic clutches 43 and 44 described later can be reduced. The hydraulic pump unit 26 is a hydraulic control unit including an oil pump, an oil control valve, and other components.

Figure 5:
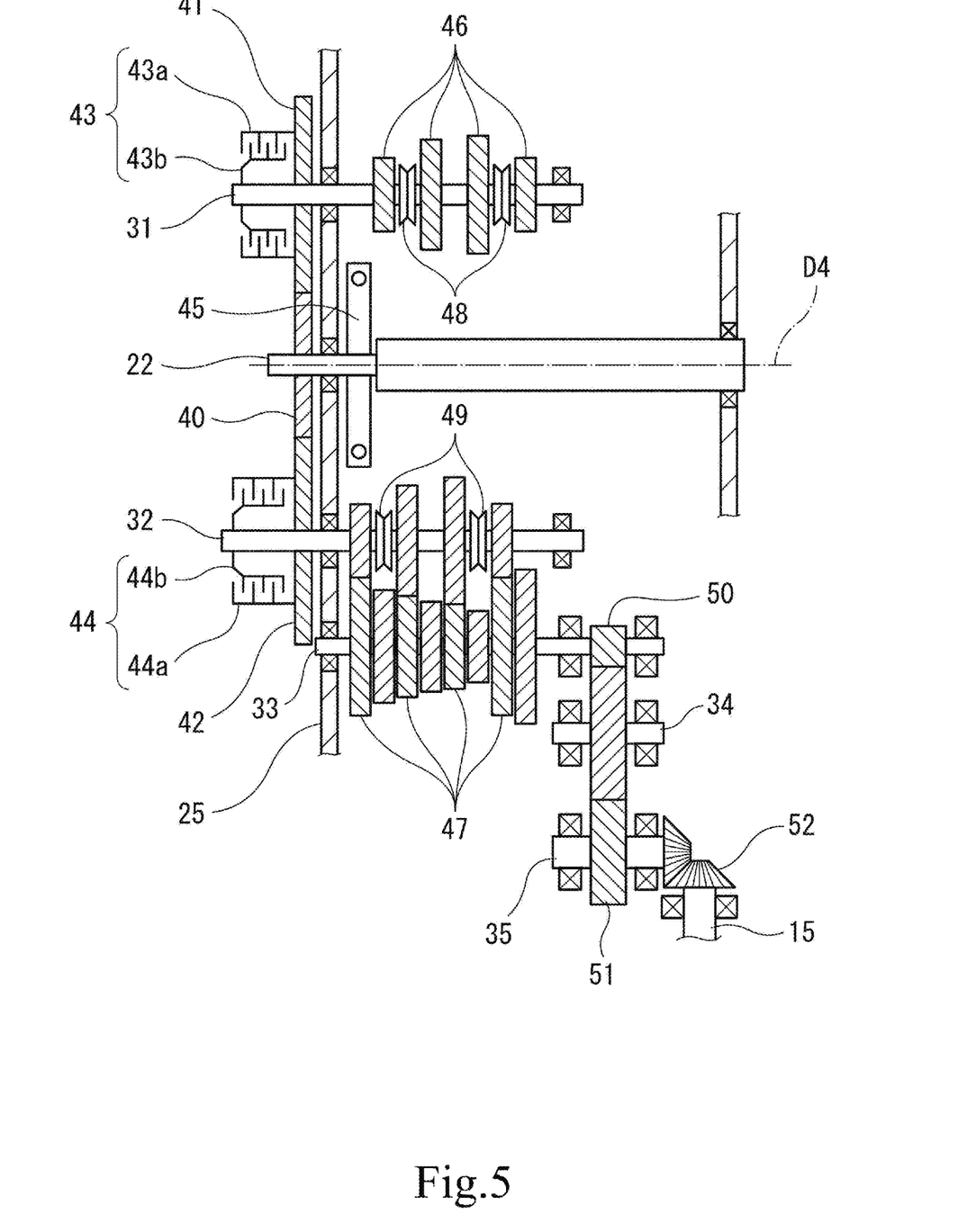
FIG. 5 is a developed view of the power unit shown in FIG. 2.

FIG. 5 is a developed view of the DCT-equipped power unit 10 shown in FIG. 2. FIG. 5 is an imaginary view based on the assumption that the DCT-equipped power unit 10 is cut along a line passing through the shafts 31, 22, 32, 33, 34, and 35 of FIG. 4 in this order. Thus, in FIG. 5, the first input shaft 31 is depicted as being significantly farther from the first countershaft 33 than the second input shaft 32, although in fact the first input shaft 31, like the second input shaft 32, is adjacent to the first countershaft 33.

Referring to FIGS. 4 and 5, the DCT 30 of the DCT-equipped power unit 10 includes the first input shaft 31, the second input shaft 32, a drive gear 40, a first primary gear 41, a second primary gear 42, a first clutch 43, a second clutch 44, a clutch damper 45, the first countershaft 33, first speed change gear pairs 46, a first gear selector 48, second speed change gear pairs 47, a second gear selector 49, the second countershaft 34, a speed reduction gear pair 50, the final shaft 35, and a final gear 51.

For the description given hereinafter, first to fifth directions D1 to D5 are defined as follows. The first direction D1 is a direction which is perpendicular to the crankshaft 22 and in which a straight line drawn between the crankshaft 22 and the first input shaft 31 extends. The second direction D2 is a direction which is perpendicular to the crankshaft 22 and in which a straight line drawn between the crankshaft 22 and the second input shaft 32 extends. The third direction D3 is a direction which is perpendicular to the crankshaft 22 and in which a straight line drawn between the crankshaft 22 and the first countershaft 33 extends. The fourth direction D4 is a direction in which the axis of the crankshaft 22 extends. The fifth direction D5 is a direction which is perpendicular to the fourth direction D4 and in which the cylinder 21 projects.

The first and second input shafts 31 and 32 are positioned parallel to the crankshaft 22. End portions of the crankshaft 22, first input shaft 31, and second input shaft 32 project outward from the power unit case 25 in the same direction (e.g., the leftward direction). The drive gear 40 is mounted on the projecting end portion of the crankshaft 22 to rotate together with the crankshaft 22. The first primary gear 41 is mounted on the projecting end portion of the first input shaft 31 to rotate together with the first input shaft 31. The second primary gear 42 is mounted on the projecting end portion of the second input shaft 32 to rotate together with the second input shaft 32. The first primary gear 41 is in mesh with the drive gear 40, and the second primary gear 42 is also in mesh with the drive gear 40. The drive gear 40, first primary gear 41, and second primary gear 42 are located in the same imaginary plane.

The first clutch 43 is configured to disable power transmission from the crankshaft 22 to the first input shaft 31. The second clutch 44 is configured to disable power transmission from the crankshaft 22 to the second input shaft 32. Each of the first and second clutches 43 and 44 is a friction clutch (e.g., a multi-plate clutch) which can be brought into a half-clutch state (a state where the clutch is partially engaged). The first clutch 43 is adjacent to the first primary gear 41, and the second clutch 44 is adjacent to the second primary gear 42. The first clutch 43 includes an outer case 43*a* rotatable together with the first primary gear 41 and an inner case 43*b* rotatable together with the first input shaft 31. The second clutch 44 includes an outer case 44*a* rotatable together with the second primary gear 42 and an inner case 44*b* rotatable together with the second input shaft 32.

The drive gear 40, first primary gear 41, and second primary gear 42 are located outside the power unit case 25 and on the same side (e.g., on the left) with respect to the power unit case 25. Thus, the drive gear 40, first primary gear 41, and second primary gear 42 can be prevented from interfering with the cylinder block of the engine 20 which is located forward of the power unit case 25 and, at the same time, the first and primary gears 41 and 42 can be increased in size to increase their reduction ratios. The first and second clutches 43 and 44 are also located outside the power unit case 25. The drive gear 40, first primary gear 41, second primary gear 42, first clutch 43, and second clutch 44 may be enclosed by a cover mounted on the outer side of the power unit case 25.

The clutch damper 45 is located on the power transmission route between the crankshaft 22 and the DCT 30. The clutch damper 45 is mounted around the axis of the crankshaft 22. The clutch damper 45 is a device that reduces the change in clutch operation feeling caused by torque variation.

The first countershaft 33 is positioned parallel to the first and second input shafts 31 and 32. The first speed change gear pairs 46 are mounted on the first input shaft 31 and the first countershaft 33 and transmit power from the first input shaft 31 to the first countershaft 33 while effecting a speed change between the first input shaft 31 and the first countershaft 33. For example, the first speed change gear pairs 46 are associated with the first, third, and fifth gear positions, respectively. The second speed change gear pairs 47 are mounted on the second input shaft 32 and the first countershaft 33 and transmit power from the second input shaft 32 to the first countershaft 33 while effecting a speed change between the second input shaft 32 and the first countershaft 33. For example, the second speed change gear pairs 47 are associated with the second, fourth, and sixth gear positions, respectively. The first and second speed change gear pairs 46 and 47 are staggered in the fourth direction D4.

The first gear selector 48 is fitted around the first input shaft 31 so as to be slidable along the first input shaft 31. The first gear selector 48 is configured to engage with a selected one of the first speed change gear pairs 46 to establish a power transmission route. The second gear selector 49 is fitted around the second input shaft 32 so as to be slidable along the second input shaft 32. The second gear selector 49 is configured to engage with a selected one of the second speed change gear pairs 47 to establish a power transmission route.

The first and second gear selectors 48 and 49 are configured to slide by being driven by a shift actuator 63 described later (see FIG. 6). For example, the shift actuator 63 causes a shift drum to rotate, and a shift fork guided by a guide groove of the rotating shift drum slides one of the first and second gear selectors 48 and 49.

The first primary gear 41 has a larger outer diameter than the gears of the first speed change gear pairs 46, and the second primary gear 42 has a larger outer diameter than the gears of the second speed change gear pairs 47. The first and second speed change gear pairs 46 and 47 are located on one side (on the right in FIG. 5) with respect to the first and second primary gears 41 and 42 in a direction perpendicular to the imaginary plane in which the first and second primary gears 41 and 42 are located. The first and second speed change gear pairs 46 and 47 are located inside the power unit case 25.

The second countershaft 34 is positioned parallel to the first countershaft 33. The speed reduction gear pair 50 is mounted on the first and second countershafts 33 and 34 and transmits the rotation of the first countershaft 33 to the second countershaft 34. The second countershaft 34 is located between the first and second input shafts 31 and 32 in the fifth direction D5.

The final shaft 35 is positioned parallel to the second countershaft 34. The final gear 51 transmits the rotation of the second countershaft 34 to the final shaft 35. The output shaft 15 extends in a direction perpendicular to the final shaft 35. The rotation of the final shaft 35 is transmitted to the output shaft 15 through a bevel gear 52. The output shaft 15 projects outward from the power unit case 25. The DCT 30 is located between the engine 20 and the output shaft 15 in a direction perpendicular to the fourth direction D4.

As seen from FIG. 4, the first input shaft 31 overlaps the crankshaft 22 when viewed in the first direction D1 perpendicular to the crankshaft 22. The second input shaft 32 overlaps the crankshaft 22 when viewed in the second direction D2 perpendicular to the crankshaft 22. The first countershaft 33 overlaps the crankshaft 22 when viewed in the third direction D3 perpendicular to the crankshaft 22. The second countershaft 34 is located opposite the first and second input shafts 31 and 32 with respect to the first countershaft 33. In the present embodiment, the second countershaft 34 overlaps the crankshaft 22 when viewed in the third direction D3. The final shaft 35 is located closer to the oil pan 25*b* than the second countershaft 34.

The crankshaft 22 extends in the fourth direction D4 (e.g., a horizontal direction) perpendicular to the first to third directions D1 to D3. The cylinder 21 projects in the fifth direction D5 (e.g., an up-down direction) perpendicular to the fourth direction D4. The first input shaft 31 is located on one side with respect to the crankshaft 22 in the fifth direction D5 (e.g., above the crankshaft 22), while the second input shaft 32 is located on the other side with respect to the crankshaft 22 in the fifth direction D5 (e.g., below the crankshaft 22). The first input shaft 31 is located on one side with respect to the first countershaft 33 in the fifth direction D5 (e.g., above the first countershaft 33), while the second input shaft 32 is located on the other side with respect to the first countershaft 33 in the fifth direction D5 (e.g., below the first counter shaft 33). The first input shaft 31 is adjacent to the cylinder 21 in a direction (e.g., the third direction D3) perpendicular to both the fourth and fifth directions D4 and D5. A straight line drawn between the first and second input shafts 31 and 32 may extend along the axis of the cylinder 21 in an imaginary plane perpendicular to the axes of the first and second input shafts 31 and 32. When, for example, the cylinder 21 is inclined with respect to the vertical direction, the straight line drawn between the first and second input shafts 31 and 32 may also be inclined.

The first input shaft 31, second input shaft 32, first countershaft 33, second countershaft 34, and final shaft 35 are located on the same side (on the right in FIG. 4) with respect to the crankshaft 22 in a horizontal direction. That is, the entire DCT 30 is located on one side with respect to the crankshaft 22 in the horizontal direction. The crankshaft 22, first countershaft 33, and second countershaft 34 are arranged in this order in the third direction D3. The first and second input shafts 31 and 32 are located between the crankshaft 22 and the first countershaft 33 in the third direction D3.

The cylinder 21 of the engine 20 includes an intake port 21a and an exhaust port 21b. An intake device (e.g., an intake pipe) is connected to the intake port 21a. An exhaust device (e.g., an exhaust pipe) is connected to the exhaust port 21b. The intake port 21a is located closer to the DCT 30 than the exhaust port 21b. Specifically, the intake port 21a is located on the side of the cylinder 21 facing the DCT 30 in the third direction D3, while the exhaust port 21b is located on the side of the cylinder 21 opposite the DCT 30 in the third direction D3. Thus, the DCT 30 can be kept away and protected from heat emitted by the exhaust port 21b which tends to become hot.

Figure 6:
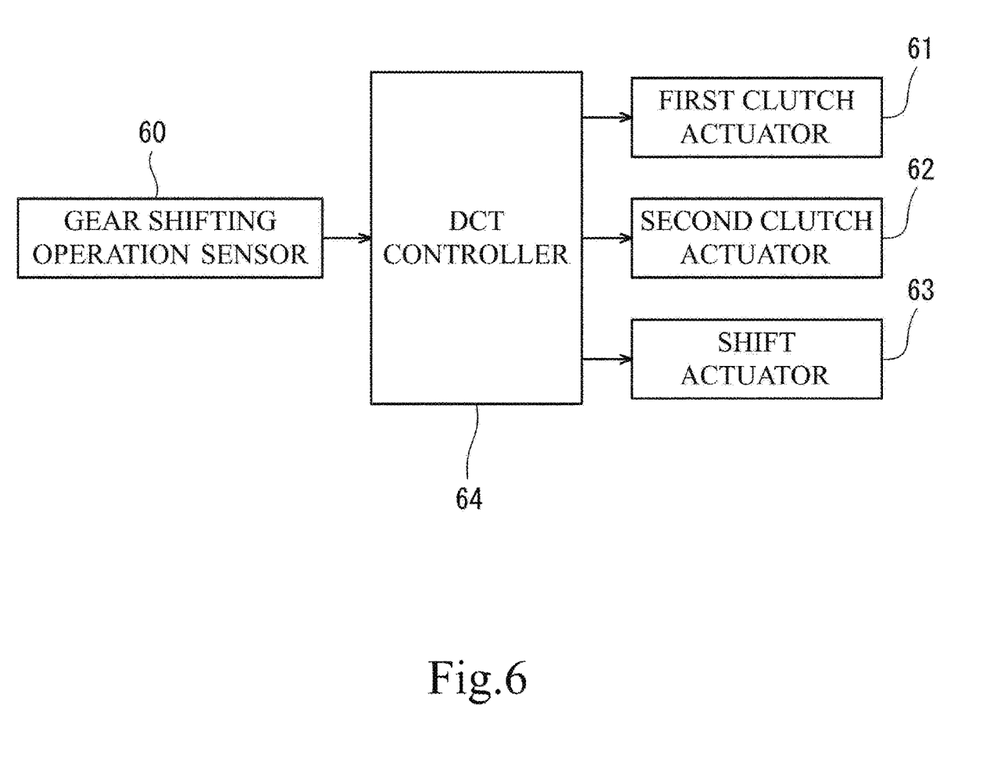
FIG. 6 is a block diagram of a control system for controlling a DCT shown in FIG. 2.

FIG. 6 is a block diagram of a control system of the DCT 30 shown in FIG. 2. As shown in FIG. 6, the utility vehicle 1 includes a gear shifting operation sensor 60, a first clutch actuator 61, a second clutch actuator 62, a shift actuator 63, and a DCT controller 64. The gear shifting operation sensor 60 detects a gear shifting operation performed by the driver of the utility vehicle 1 to select a gear position. The first clutch actuator 61 is configured to actuate the first clutch 43, while the second clutch actuator 62 is configured to actuate the second clutch 44. The shift actuator 63 slides a desired one of the first and second gear selectors 48 and 49.

The DCT controller 64 controls the first clutch actuator 61, second clutch actuator 62, and shift actuator 63 in response to the gear shifting operation detected by the gear shifting operation sensor 60. When a gear position associated with one of the first speed change gear pairs 46 mounted on the first input shaft 31 is selected, the first clutch 43 is brought into an engaged state, the second clutch 44 is brought into a disengaged state, and the first gear selector 48 mounted on the first input shaft 31 is engaged with the first speed change gear pair 46. When a gear position associated with one of the second speed change gear pairs 47 mounted on the second input shaft 32 is selected, the first clutch 43 is brought into a disengaged state, the second clutch 44 is brought into an engaged state, and the second gear selector 49 mounted on the second input shaft 32 is engaged with the second speed change gear pair 47.

In the configuration described above, each of the first input shaft 31, second input shaft 32, first countershaft 33, second countershaft 34, and final shaft 35 overlaps the crankshaft 22 when viewed in a direction perpendicular to the axial direction D4 of the crankshaft 22. As such, the width (the size in the axial direction D4) of the DCT-equipped power unit 10 can be reduced. Additionally, the DCT 30 does not project significantly from the engine 20 in the fourth direction D4 and is located between the engine 20 and the output shaft 15 in a direction perpendicular to the fourth direction D4. Thus, the power unit case 25 need not be formed in a complicated shape such as an L-shape which has a relatively long perimeter. This makes it easier to increase the stiffness of the power unit case 25. In particular, since the DCT 30 is located adjacent to the multi-cylinder engine 20 in a direction perpendicular to the axial direction D4, the DCT-equipped power unit 10 can be constructed as a compact power unit.

The drive gear 40, first primary gear 41, and second primary gear 42 are located outside the power unit case 25 and on the same side with respect to the power unit case 25, and the first and second gear pairs 46 and 47 are located inside the power unit case 25. As such, the size of the power unit case 25 can be reduced while satisfactory primary speed reduction is achieved by the primary gears 41 and 42.

The first and second clutches 43 and 44 are located outside the power unit case 25. As such, maintenance of the clutches 43 and 44 can be carried out without disassembling the power unit case 25.

The first input shaft 31 is located on one side with respect to the crankshaft 22 in the fifth direction D5 and adjacent to the cylinder 21 of the engine 20, and the second input shaft 32 is located on the other side with respect to the crankshaft 22 in the fifth direction D5. As such, the size of the DCT-equipped power unit 10 can be reduced also in a direction perpendicular to the crankshaft 22 (the third direction D3 in the present embodiment).

The first input shaft 31, second input shaft 32, first countershaft 33, second countershaft 34, and final shaft 35 are all located on one side with respect to the crankshaft 22. As such, the overall size of the DCT-equipped power unit 10 can be reduced.

The drive gear 40, first primary gear 41, and second primary gear 42 are located in an imaginary plane, and the first and second speed change gear pairs 46 and 47 are located on one side with respect to the drive gear 40, first primary gear 41, and second primary gear 42 in a direction perpendicular to the imaginary plane. As such, the overall size of the DCT-equipped power unit 10 can be reduced.

The clutch damper 45 is located between the crankshaft 22 and the DCT 30 and mounted around the axis of the crankshaft 22. This can reduce the load imposed on the clutch damper 45 in the event of, for example, abrupt torque variation. The farther the location of the clutch damper 45 is from the location of the crankshaft 22 on the power transmission route, the greater is the load imposed on the clutch damper 45 upon an operation involving abrupt torque variation. When the clutch damper 45 is disposed as in the present embodiment, the load imposed on the clutch damper 45 can be reduced.

Figure 7:
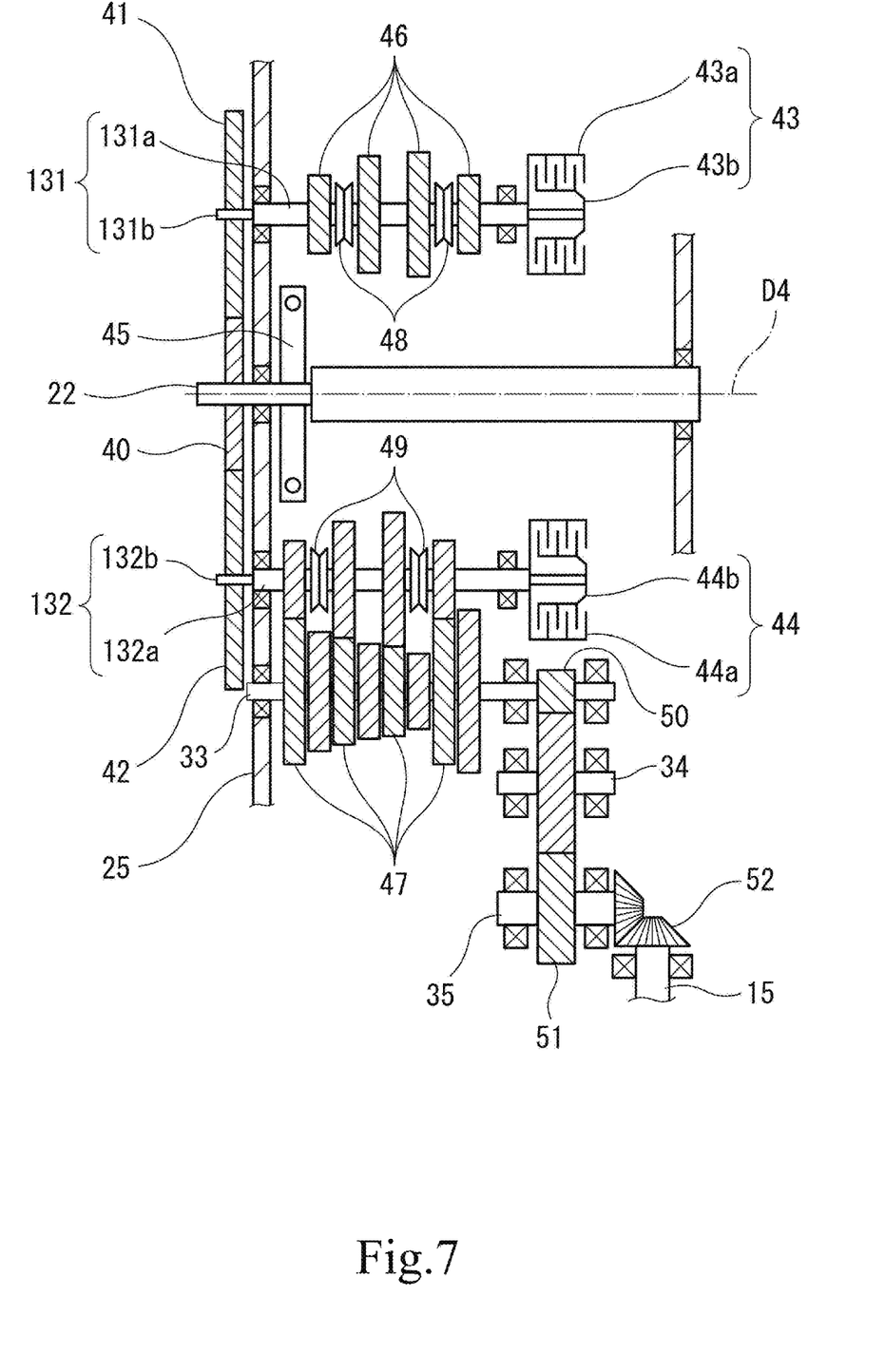
FIG. 7 is a developed view of a first variant of the power unit of FIG. 4.

FIG. 7 is a developed view of a first variant of the DCT-equipped power unit 10 of FIG. 4. The elements identical to those of the embodiment previously described are denoted by the same reference signs and will not be described below. In the first variant, as seen from FIG. 7, the first and second clutches 43 and 44 are enclosed in the power unit case 25. The first clutch 43 overlaps the crankshaft 22 when viewed in the first direction D1. The first clutch 43 is mounted on an end portion of a first input shaft 131 opposite the first primary gear 41. The second clutch 44 overlaps the crankshaft 22 when viewed in the second direction D2. The second clutch 44 is mounted on an end portion of a second input shaft 132 opposite the second primary gear 42.

The first input shaft 131 includes an outer pipe 131a and an inner pipe 131b rotatably inserted into the outer pipe 131a and projecting from both axial ends of the outer pipe 131a. The first primary gear 41 is mounted on one end portion of the inner pipe 131b, and the inner case 43b of the first clutch 43 is mounted on the other end portion of the inner pipe 131b. Thus, the rotation of the first primary gear 41 is transmitted to the inner case 43b through the inner pipe 131b. The first speed change gear pairs 46 and the first gear selector 48 are mounted on the outer pipe 131a, and the outer case 43a of the first clutch 43 is mounted on an end portion of the outer pipe 131a. Thus, the rotation transmitted from the inner case 43b to the outer case 43a in the first clutch 43 is transmitted to the outer pipe 131a from the outer case 43a.

The second input shaft 132 includes an outer pipe 132a and an inner pipe 132b rotatably inserted into the outer pipe 132a and projecting from both axial ends of the outer pipe 132a. The second primary gear 42 is mounted on one end portion of the inner pipe 132b, and the inner case 44b of the second clutch 44 is mounted on the other end portion of the inner pipe 132b. Thus, the rotation of the second primary gear 42 is transmitted to the inner case 44b through the inner pipe 132b. The second speed change gear pairs 47 and the second gear selector 49 are mounted on the outer pipe 132a, and the outer case 44a of the second clutch 44 is mounted on an end portion of the outer pipe 132a. Thus, the rotation transmitted from the inner case 44b to the outer case 44a in the second clutch 44 is transmitted to the outer pipe 132a from the outer case 44a.

In the above configuration, the first and second clutches 43 and 44 are mounted on those end portions of the first and second input shafts 131 and 132 which are opposite the first and second primary gears 41 and 42, rather than being adjacent to the first and second primary gears 41 and 42. Thus, the first and second clutches 43 and 44 can be enclosed in the power unit case 25. This can reduce the width (the size in the axial direction D4) of the DCT-equipped power unit 10. The other features of the first variant are the same as those of the previously described embodiment, and will therefore not be described repeatedly.

Figure 8:
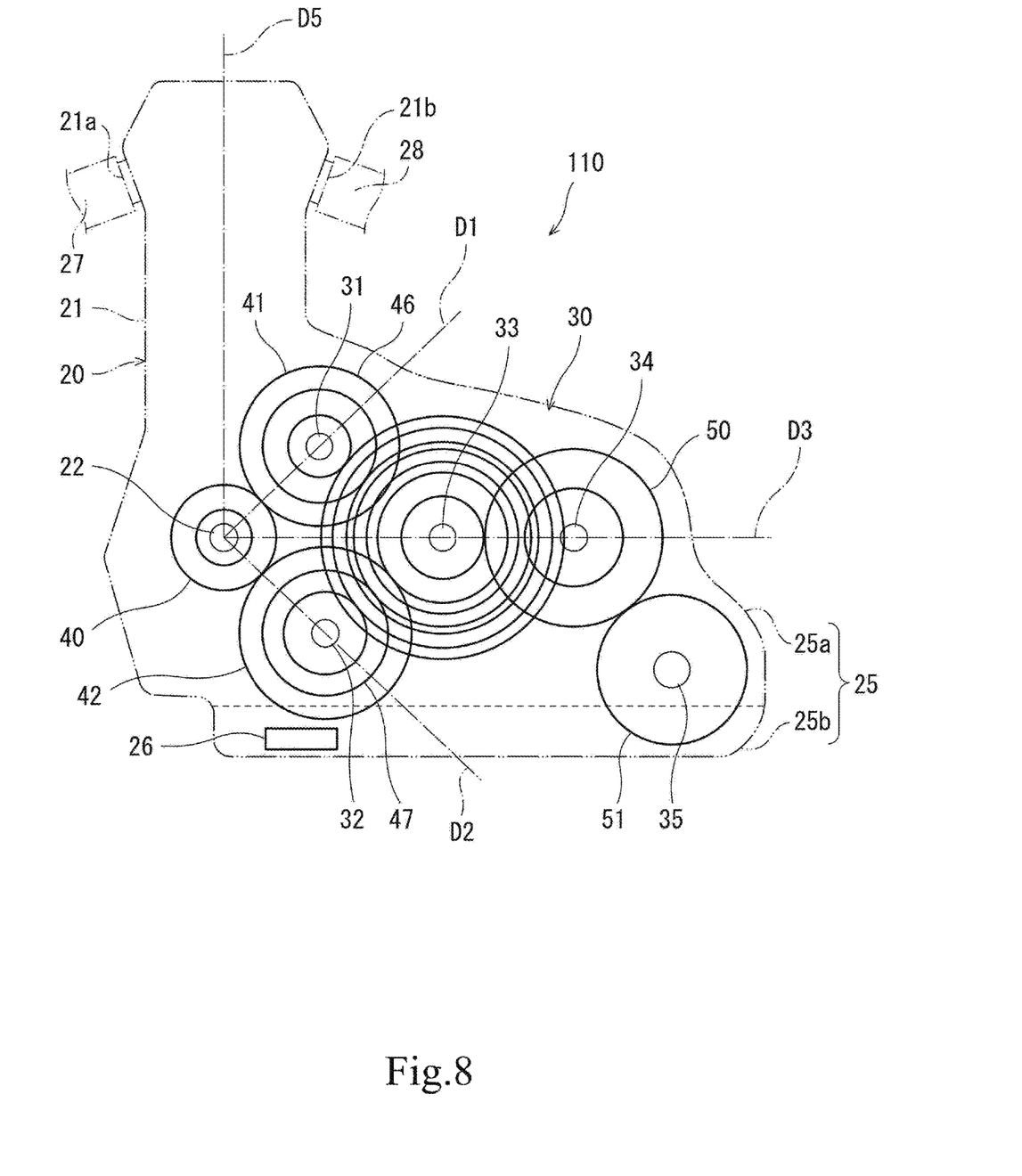
FIG. 8 is a side view of a second variant of the power unit of FIG. 4.
Figure 9:
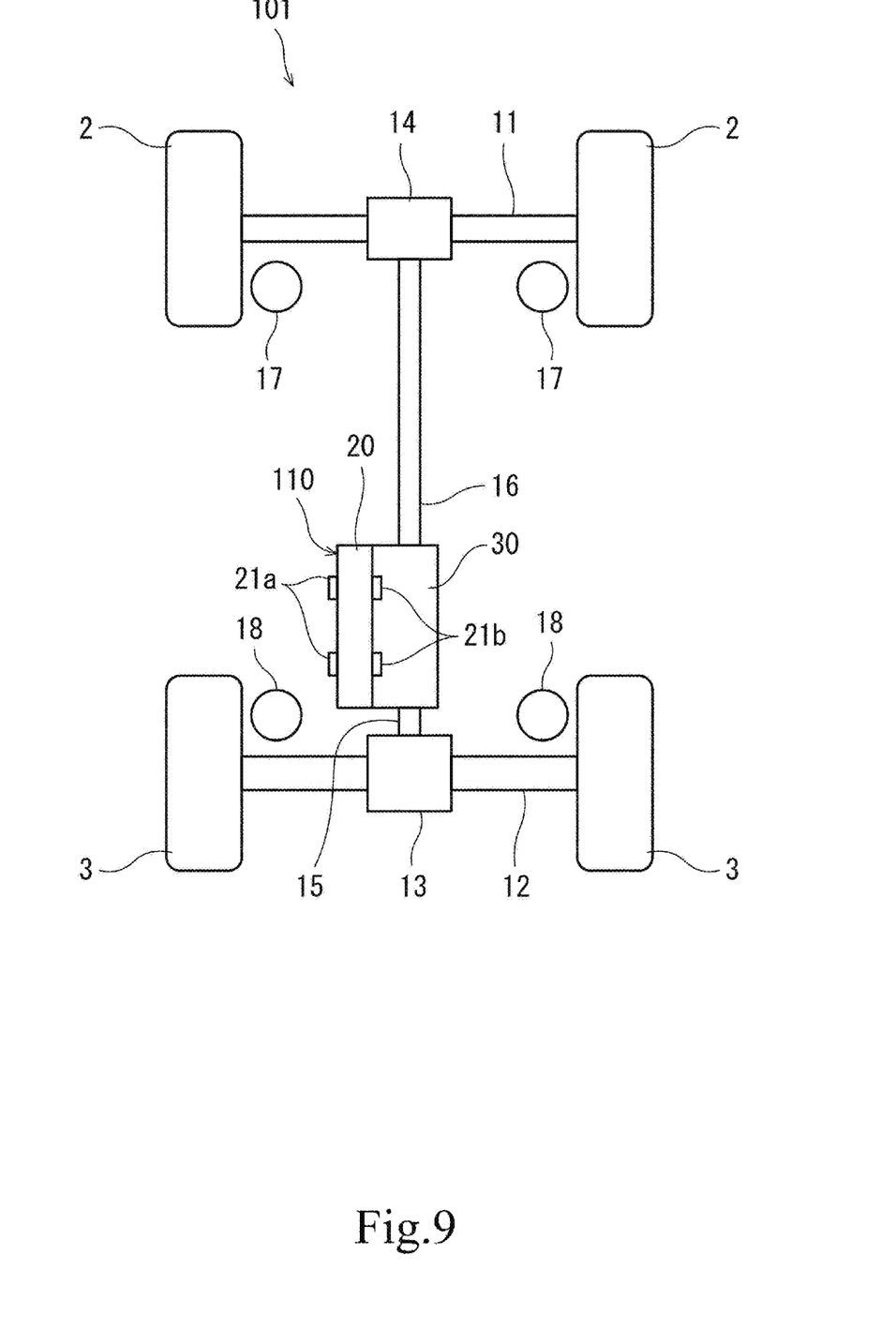
FIG. 9 is a plan view of a utility vehicle incorporating the power unit of FIG. 8.

FIG. 8 is a side view of a second variant of the power unit 10 of FIG. 4. FIG. 9 is a plan view of a utility vehicle 101 incorporating a power unit 110 of FIG. 8. The elements identical to those of the embodiment previously described are denoted by the same reference signs and will not be described below. In the power unit 110 of the second variant, as seen from FIGS. 8 and 9, the positional relationship between the intake port 21a and the exhaust port 21b is reverse to that in the previously described embodiment. Specifically, in the power unit 110, the exhaust port 21b is located on the side of the cylinder 21 facing the DCT 30 in the third direction D3, while the intake port 21a is located on the side of the cylinder 21 opposite the DCT 30 in the third direction D3. Thus, in the engine 20, the exhaust port 21b is located closer to the DCT 30 than the intake port 21a. As such, the vehicle components (such as the rear suspensions 18) distal to the DCT 30 can be kept away from heat of the exhaust device 27. The other features of the second variant are the same as those of the previously described embodiment, and will therefore not be described repeatedly.

Many modifications and other embodiments of the present invention will be apparent to those skilled in the art from the foregoing description. Accordingly, the foregoing description is to be construed as illustrative only, and is provided for the purpose of teaching those skilled in the art the best mode for carrying out the invention. The details of the structure and/or function may be varied substantially without departing from the scope of the invention.

What is claimed is:

1. A dual clutch transmission-equipped power unit comprising:
    a prime mover comprising a drive shaft; and
    a dual clutch transmission that changes the speed of rotation produced by rotational power output by the drive shaft,
    the dual clutch transmission comprising:
        a first input shaft configured to be connected to the drive shaft;
        a second input shaft configured to be connected to the drive shaft;
        a first clutch configured to disable power transmission from the drive shaft to the first input shaft;
        a second clutch configured to disable power transmission from the drive shaft to the second input shaft;
        a countershaft;
        a plurality of first speed change gear pairs configured to transmit power from the first input shaft to the countershaft; and
        a plurality of second speed change gear pairs configured to transmit power from the second input shaft to the countershaft, wherein
    the first input shaft overlaps the drive shaft when viewed in a first direction perpendicular to the drive shaft,
    the second input shaft overlaps the drive shaft when viewed in a second direction perpendicular to the drive shaft,
    the countershaft overlaps the drive shaft when viewed in a third direction perpendicular to the drive shaft, and
    the dual clutch transmission-equipped power unit further comprises:
        a drive gear mounted on an end portion of the drive shaft;
        a first primary gear mounted on an end portion of the first input shaft and being in mesh with the drive gear; and
        a second primary gear mounted on an end portion of the second input shaft and being in mesh with the drive gear.

2. The dual clutch transmission-equipped power unit according to claim 1, further comprising:
    a case enclosing the drive shaft, the first input shaft, and the second input shaft, wherein
    the end portion of the drive shaft, the end portion of the first input shaft, and the end portion of the second input shaft project outward from the case in the same direction,
    the first primary gear has a larger outer diameter than gears of the first speed change gear pairs,
    the second primary gear has a larger outer diameter than gears of the second speed change gear pairs,
    the drive gear, the first primary gear, and the second primary gear are located outside the case and on the same side with respect to the case, and
    the first and second speed change gear pairs are located inside the case.

3. The dual clutch transmission-equipped power unit according to claim 2, wherein
    the first clutch is adjacent to the first primary gear,
    the second clutch is adjacent to the second primary gear, and
    the first and second clutches are located outside the case.

4. The dual clutch transmission-equipped power unit according to claim 2, wherein the first clutch overlaps the drive shaft when viewed in the first direction, and the first clutch is located inside the case.

5. The dual clutch transmission-equipped power unit according to claim 4, wherein the second clutch overlaps the drive shaft when viewed in the second direction, and the second clutch is located inside the case.

6. The dual clutch transmission-equipped power unit according to claim 1, wherein the prime mover is an engine comprising a crankshaft and a cylinder, the drive shaft is the crankshaft, the crankshaft extends in a fourth direction, the cylinder projects in a fifth direction perpendicular to the fourth direction, the first input shaft is located on one side with respect to the crankshaft in the fifth direction and adjacent to the cylinder, and the second input shaft is located on the other side with respect to the crankshaft in the fifth direction.

7. The dual clutch transmission-equipped power unit according to claim 1, wherein the cylinder comprises an intake port and an exhaust port, and the exhaust port is located closer to the dual clutch transmission than the intake port.

8. The dual clutch transmission-equipped power unit according to claim 1, wherein the countershaft is located on one side with respect to the drive shaft in a direction perpendicular to the drive shaft, and the first and second input shafts are located on the one side with respect to the drive shaft.

9. The dual clutch transmission-equipped power unit according to claim 1, wherein the drive gear, the first primary gear, and the second primary gear are located in an imaginary plane, and the first speed change gear pairs and the second speed change gear pairs are located on one side with respect to the drive gear, the first primary gear, and the second primary gear in a direction perpendicular to the imaginary plane.

10. The dual clutch transmission-equipped power unit according to claim 1, wherein the dual clutch transmission includes a clutch damper, the prime mover is an engine, the drive shaft is a crankshaft of the engine, and the clutch damper interfaces with the crankshaft and is mounted around an axis of the crankshaft.

11. The dual clutch transmission-equipped power unit according to claim 1, wherein the first clutch and the second clutch are arranged in an up-down direction.

12. The dual clutch transmission-equipped power unit according to claim 1, wherein the first clutch is located on one side with respect to a straight line drawn between the drive shaft and the countershaft, the second clutch is located on another side with respect to the straight line.

13. The dual clutch transmission-equipped power unit according to claim 1, further comprising an output shaft through which a drive power output by the dual clutch transmission is transmitted to a rear axle of a vehicle.

14. The dual clutch transmission-equipped power unit according to claim 1, wherein the dual clutch transmission further comprises:

a final gear that receives a drive power from the countershaft and is located below the countershaft; and a case that encloses the first input shaft, the second input shaft, the countershaft, and the final gear, wherein the case includes a case main body and an oil pan located beneath the case main body.

* * * * *